(12) United States Patent
Ito et al.

(10) Patent No.: US 10,232,299 B2
(45) Date of Patent: Mar. 19, 2019

(54) HONEYCOMB STRUCTURE

(71) Applicant: NGK Insulators, Ltd., Nagoya (JP)

(72) Inventors: Yoshitaka Ito, Nagoya (JP); Hajime Tanaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 279 days.

(21) Appl. No.: 14/847,451

(22) Filed: Sep. 8, 2015

(65) Prior Publication Data

US 2016/0074800 A1 Mar. 17, 2016

(30) Foreign Application Priority Data

Sep. 11, 2014 (JP) .................. 2014-184770
Jun. 24, 2015 (JP) .................. 2015-126979

(51) Int. Cl.
*B01J 35/04* (2006.01)
*C04B 35/00* (2006.01)
(Continued)

(52) U.S. Cl.
CPC ..... *B01D 46/2462* (2013.01); *B01D 46/2418* (2013.01); *B01D 46/2459* (2013.01);
(Continued)

(58) Field of Classification Search
CPC ............ B01D 46/2418; B01D 46/2459; B01D 46/2462; B01J 35/04; C04B 41/009; C04B 41/5089; C04B 41/85; C04B 2111/00796; C04B 2111/0081; F01N 3/0222; F01N 3/035; F01N 3/2828; F01N 2330/06;
(Continued)

(56) References Cited

U.S. PATENT DOCUMENTS 6,060,148 A 5/2000 Matsubara et al.
6,352,756 B1 3/2002 Ichikawa et al.
(Continued)

FOREIGN PATENT DOCUMENTS

EP 1 063 396 A2 12/2000
EP 1 486 255 A1 12/2004
(Continued)

OTHER PUBLICATIONS

European Office Action (Application No. 15184834.8) dated May 10, 2017.
(Continued)

*Primary Examiner* — David Sample
*Assistant Examiner* — Elizabeth Collister
(74) *Attorney, Agent, or Firm* — Burr & Brown, PLLC

(57) ABSTRACT

A honeycomb structure includes a honeycomb substrate having a porous partition wall that defines a plurality of cells that extend from an inlet end face as an inlet side for a fluid to an outlet end face as an outlet side for the fluid, and a porous circumferential wall that is monolithically formed with the partition wall, and a coat layer that is disposed on at least a part of the outer surface of the circumferential wall. Here, a part of the coat layer penetrates into the pores of the circumferential wall, and a thickness of the part of the coat layer that penetrates into the pores of the circumferential wall is from 1 to 90% of the thickness of the circumferential wall.

14 Claims, 3 Drawing Sheets

(51) Int. Cl.
*C04B 41/85* (2006.01)
*F01N 3/035* (2006.01)
*F01N 3/28* (2006.01)
*B01D 46/24* (2006.01)
*C04B 41/00* (2006.01)
*C04B 41/50* (2006.01)
*F01N 3/022* (2006.01)
*C04B 38/00* (2006.01)
*C04B 111/00* (2006.01)
*C04B 35/195* (2006.01)

(52) U.S. Cl.
CPC ............ *B01J 35/04* (2013.01); *C04B 41/009* (2013.01); *C04B 41/5089* (2013.01); *C04B 41/85* (2013.01); *F01N 3/0222* (2013.01); *F01N 3/035* (2013.01); *F01N 3/2828* (2013.01); *C04B 2111/0081* (2013.01); *C04B 2111/00793* (2013.01); *F01N 2330/06* (2013.01); *F01N 2330/30* (2013.01); *F01N 2330/60* (2013.01); *F01N 2510/068* (2013.01); *F01N 2510/0682* (2013.01); *F01N 2510/0684* (2013.01)

(58) Field of Classification Search
CPC ............ F01N 2330/30; F01N 2330/60; F01N 2510/068; F01N 2510/0682; F01N 2510/0684
See application file for complete search history.

(56) References Cited

U.S. PATENT DOCUMENTS

| | | |
|---|---|---|
| 2002/0022109 A1 | 2/2002 | Ichikawa et al. |
| 2003/0143370 A1* | 7/2003 | Noguchi ............ B01D 46/2429 428/116 |
| 2004/0052941 A1 | 3/2004 | Ichikawa et al. |
| 2005/0123716 A1 | 6/2005 | Miwa et al. |
| 2005/0159308 A1 | 7/2005 | Bliss et al. |
| 2005/0261128 A1 | 11/2005 | Hirai |
| 2006/0210764 A1 | 9/2006 | Yamada et al. |
| 2007/0243357 A1 | 10/2007 | Ichikawa |
| 2008/0236122 A1* | 10/2008 | Ito ..................... B01D 46/2462 55/523 |
| 2008/0280064 A1 | 11/2008 | Tokunaga et al. |
| 2011/0203242 A1* | 8/2011 | Goto .................. B01D 46/2429 55/523 |
| 2011/0224071 A1 | 9/2011 | Okumura et al. |

FOREIGN PATENT DOCUMENTS

| | | |
|---|---|---|
| EP | 1 702 909 A1 | 9/2006 |
| JP | 56-133036 A1 | 10/1981 |
| JP | H10-264274 A1 | 10/1998 |
| JP | 2000-000809 A1 | 1/2000 |
| JP | 2001-000871 A1 | 1/2001 |
| JP | 2004-113887 A1 | 4/2004 |
| JP | 2011-206764 A1 | 10/2011 |
| WO | 2007/072694 A1 | 6/2007 |

OTHER PUBLICATIONS

Extended European Search Report (Application No. 15184834.8) dated Mar. 9, 2016.
European Office Action (Application No. 15184834.8) dated Oct. 2, 2017.
Japanese Office Action (Application No. 2015-126979) dated Nov. 6, 2018 (with English translation).

* cited by examiner

HONEYCOMB STRUCTURE

The present application is an application based on JP 2014-184770 and JP 2015-126979 filed on Sep. 11, 2014 and Jun. 24, 2015 respectively with Japan Patent Office, the entire contents of which are incorporated herein by reference.

BACKGROUND OF THE INVENTION

Field of the Invention

The present invention relates to a honeycomb structure that is used in filters for trapping particulate matters included in exhaust gases from diesel engines or gasoline engines, and the like, and especially relates to a honeycomb structure that can be preferably used in filters for which loading of a catalyst is required, and the like.

Description of the Related Art

Particulate matters (PM) are contained in exhaust gases from diesel engines and gasoline engines such as GDI (Gasoline Direct Injection) engines. The PM is mainly composed of carbon particulates such as soot and has been found to have a cancer-causing property. Therefore, it is necessary to prevent the PM from being released into the air, and thus a strict discharge regulation is imposed.

In order to correspond to such strict discharge regulation, various studies for decreasing the PM discharge amount have been conducted, but there is a limit to decrease the PM discharge amount by improving a combustion technology, and the only effective means for decreasing the PM discharge amount as of now is to install a filter in an exhaust system.

As a filter for trapping PM, wall flow type filters using a honeycomb structure are widely used since a high PM trapping efficiency can be obtained while a pressure loss is suppressed to be within an acceptable range. A honeycomb structure used in a wall flow type filter has a porous partition wall that defines a plurality of cells that extend from an inlet end face as an inlet side for an exhaust gas to an outlet end face as an outlet side for the exhaust gas, and a circumferential wall. By providing plugging portions that are configured to plug the open ends at the side of the outlet end face of the predetermined cells and the open ends of at the side of the inlet end face of the residual cells to this honeycomb structure, a filter having a high PM trap efficiency can be obtained.

Among such filters, gasoline particulate filters (GPFs), which are used for removing PM contained in exhaust gases from GDI engines, are used by loading a catalyst for purifying exhaust gases onto a partition wall in many cases. In such cases, honeycomb structures having a high porosity of 50% or more are used so that a pressure loss is suppressed to be within an acceptable range after the loading of the catalyst.

A relatively small honeycomb structure used for GPF is generally such that a partition wall and a circumferential wall are formed monolithically. Such honeycomb substrate is prepared by simultaneously forming the partition wall and the circumferential wall by extrusion molding, and firing the obtained formed article, and the partition wall and circumferential wall have an identical porosity.

In the case when a catalyst is loaded on a partition wall of a honeycomb structure, a slurry containing a catalyst (catalyst slurry) is introduced in cells by a conventionally-known aspiration process or the like to attach the slurry to the surface of the partition walls and pores, and a high temperature treatment is conducted to thereby fire the catalyst contained in the catalyst slurry on the partition walls. In the case when the honeycomb structure on which a catalyst is to be loaded has a high porosity as mentioned above and the circumferential wall and the partition wall have an identical porosity, the catalyst slurry that has been introduced into the cells may pass through the pores of the circumferential wall and exude on the outer surface of the circumferential wall. Furthermore, also in the case when a catalyst is loaded on a partition wall of a honeycomb structure in which the partition wall and a circumferential wall are separately formed, the catalyst slurry that has been introduced into the cells may exude on the outer surface of the circumferential wall if the circumferential wall has a porosity of 35% or more. In addition, there is a problem that, when such exudation of the catalyst slurry occurs, the workability deteriorates in the step of loading a catalyst on the partition wall of the honeycomb structure. Furthermore, the step of loading a catalyst on the honeycomb structure is conducted under a state in which a part of the circumferential wall of the honeycomb structure is chucked (gripped), but there is a problem that, if the circumferential wall has a high porosity, a sufficient strength cannot be obtained, and the circumferential wall is easily broken during the chucking. Furthermore, there is also a problem that, if the entirety of the honeycomb structure (partition wall and circumferential wall) has a high porosity, the isostatic strength of the honeycomb structure decreases, and thus the honeycomb structure is easily broken during transportation and actual use.

Conventionally, as a technology for improving the strength of the honeycomb structure, a technology for attaching a reinforcing material to a circumferential wall is known. For example, Patent Document 1 discloses a honeycomb structure in which the circumferential part of the honeycomb structure is reinforced with a material that disappears or scatters at a high temperature. Patent Document 2 discloses a honeycomb structure in which a material having approximately the same thermal expansion rate as that of a catalyst is attached to the entire outer surface of the circumferential wall of a ceramic honeycomb structure before loading a catalyst. Patent Document 3 discloses a honeycomb catalyst carrier in which an impregnated part is formed on the outermost periphery part at a predetermined thickness of an outermost circumference which is composed of a porous body and disposed so as to cover the circumferential part of a cell structural body. Here, the impregnated part is formed by impregnating the outermost periphery part with a non-water-soluble organic substance or inorganic substance that is lost by combustion.

[Patent Document 1] JP-A-2000-809
[Patent Document 2] JP-A-2001-871
[Patent Document 3] JP-A-2004-113887

SUMMARY OF THE INVENTION

However, the reinforcing material in the honeycomb structure disclosed in Patent Document 1 disappears or scatters in the high temperature treatment in baking the catalyst on the honeycomb structure, and thus does not contribute to the improvement of the strength of the honeycomb structure after the high temperature treatment. Furthermore, the reinforcing material in the honeycomb structure disclosed in Patent Document 2 is for solving a thermal expansion difference between the inner side and outer side of the circumferential wall, and an effect for preventing the exuding of the catalyst slurry and an effect of improving an isostatic strength cannot be expected so much. Furthermore, in the honeycomb catalyst carrier disclosed in Patent Document 3, problems of the exuding of the catalyst slurry and an insufficient strength are not considered.

The present invention has been made in view of such circumstance, and aims at providing a honeycomb structure, which can prevent a catalyst slurry from exuding on the outer surface of an circumferential wall, and in which the strength of the circumferential wall has been improved, and thus the isostatic strength of the entirety of the structural body has also been improved.

According to the present invention, the following honeycomb structures are provided so as to solve the above-mentioned problem.

According to a first aspect of the present invention, a honeycomb structure, including: a honeycomb substrate having a porous partition wall that defines a plurality of cells that extend from an inlet end face as an inlet side for a fluid to an outlet end face as an outlet side for the fluid is provided, and a porous circumferential wall that is formed monolithically with the partition wall, and a coat layer that is disposed on at least a part of the outer surface of the circumferential wall, wherein a part of the coat layer penetrates into the pores of the circumferential wall, and a thickness of the part of the coat layer that penetrates into the pores of the circumferential wall is from 1 to 90% of the thickness of the circumferential wall.

According to a second aspect of the present invention, a honeycomb structure, including: a honeycomb substrate having a porous partition wall that defines a plurality of cells that extend from an inlet end face as an inlet side for a fluid to an outlet end face as an outlet side for the fluid is provided, and a porous circumferential wall having a porosity of 35% or more, that is formed separately from the partition wall, and a coat layer that is disposed on at least a part of the outer surface of the circumferential wall, wherein a part of the coat layer penetrates into the pores of the circumferential wall, and a thickness of the part of the coat layer that penetrates into the pores of the circumferential wall is from 1 to 90% of the thickness of the circumferential wall.

According to a third aspect of the present invention, the honeycomb structure according to the first or second aspects is provided, wherein a remaining part of the coat layer, other than the part that penetrates into the pores of the circumferential wall, has a thickness of 70 μm or less.

According to a fourth aspect of the present invention, the honeycomb structure according to any one of the first to third aspects is provided, wherein the coat layer contains Si.

According to a fifth aspect of the present invention, the honeycomb structure according to the fourth aspect is provided, wherein the coat layer further contains Ti.

According to a sixth aspect of the present invention, the honeycomb structure according to any one of the first to fifth aspects is provided, wherein the honeycomb substrate has a porosity of from 50 to 75%.

According to a seventh aspect of the present invention, the honeycomb structure according to any one of the first to fifth aspects is provided, wherein the honeycomb substrate has a porosity of from 59 to 67%.

According to an eighth aspect of the present invention, the honeycomb structure according to any one of the first to seventh aspects is provided, which has plugging portions that are configured to plug the open ends of the predetermined cells at the side of the inlet end face and the open ends of the residual cells at the side of the outlet end face.

Since the honeycomb structure of the present invention is such that a part of the coat layer penetrates into the pores of the circumferential wall, and that the thickness of the penetrated part has been specified to be within a predetermined range, the pores of the circumferential wall are occluded. Therefore, even a honeycomb substrate having a high porosity such that the porosity is 50% or more is used, the slurry does not exude on the outer surface of the circumferential wall when the catalyst slurry is introduced into the cells, and thus fine workability can be obtained in the step of loading the catalyst on the partition wall of the honeycomb structure. Furthermore, since the coat layer reinforces the circumferential wall, the strength of the circumferential wall is improved, and thus the breakage of the circumferential wall in chucking (gripping) a part of the circumferential wall of the honeycomb structure can be effectively prevented in the step of loading the catalyst on the honeycomb structure. In addition, as a result of the improved strength of the circumferential wall, the isostatic strength of the entirety of the honeycomb structure is also improved, and thus the breakage of the honeycomb structure during transportation and actual use can also be effectively prevented.

DESCRIPTION OF THE PREFERRED EMBODIMENTS

The present invention will be explained below based on specific exemplary embodiments, but the present invention is not interpreted by being limited to those exemplary embodiments, and modification, improvement or the like of a design can be suitably added within a scope that does not deviate from the purport of the present invention based on the general knowledge of a person skilled in the art.

Figure 1:
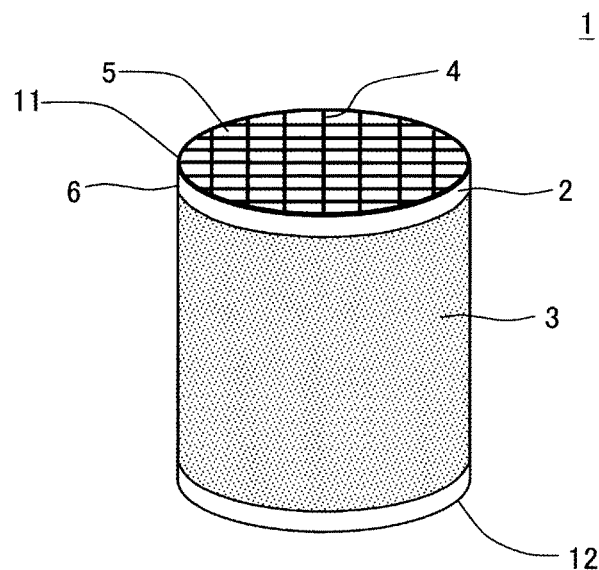
FIG. 1 is a perspective view that schematically shows an exemplary embodiment of a honeycomb structure of the present invention.
Figure 2:
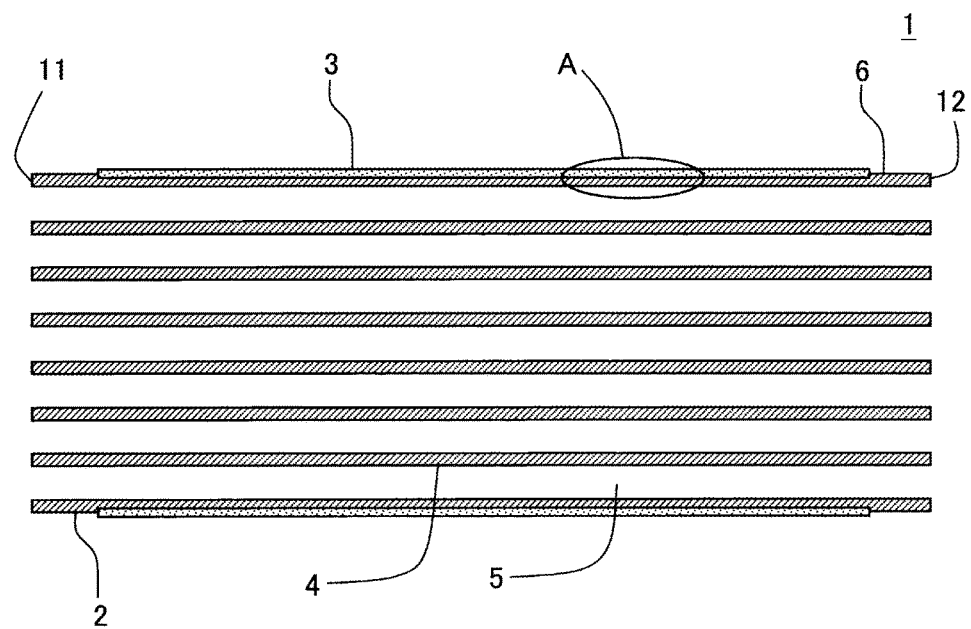
FIG. 2 is a schematic view showing a cross-sectional surface that is in parallel with the direction to which cells extend in the exemplary embodiment of the honeycomb structure of the present invention.
Figure 3:
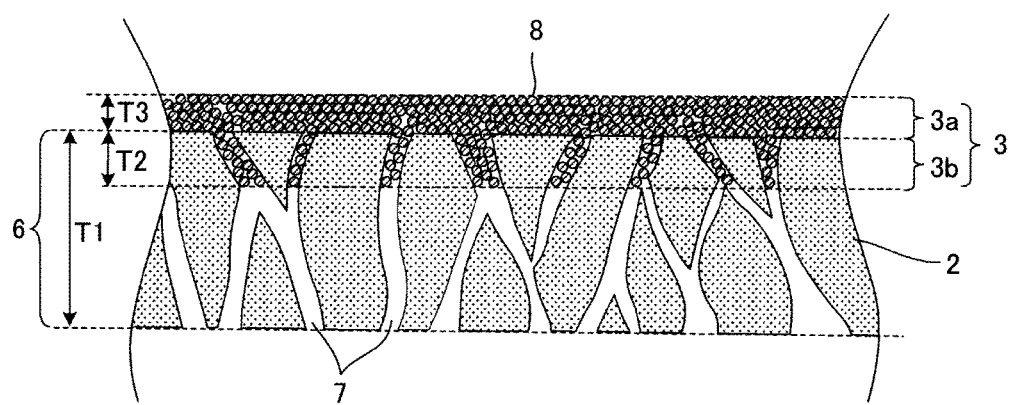
FIG. 3 is an enlarged view of the part A in FIG. 2.

(1) Honeycomb Structure:

FIG. 1 is a perspective view that schematically shows an exemplary embodiment of the honeycomb structure of the present invention. Furthermore, FIG. 2 is a schematic view shows a cross-sectional surface that is in parallel with the direction to which the cells extend in the exemplary embodiment of the honeycomb structure of the present invention, and FIG. 3 is an enlarged view of the part A in FIG. 2. As shown in FIGS. 1 and 2, a honeycomb structure 1 according to the present invention includes a honeycomb substrate 2 and a coat layer 3. The honeycomb substrate 2 has a porous partition wall 4 that defines a plurality of cells 5 that extend from an inlet end face 11 as an inlet side for a fluid to an outlet end face 12 as an outlet side for the fluid, and a porous circumferential wall 6 that is formed monolithically with the partition wall 4. The "formed monolithically" used herein means that the partition wall 4 and the circumferential wall 6 are simultaneously subjected to extrusion molding in the steps for the production of the honeycomb substrate 2, and thus the partition wall 4 and the circumferential wall 6 have been monolithic from immediately after the extrusion in the obtained formed body. In the honeycomb substrate 2 obtained by firing such formed body, the porosity of the entirety of the honeycomb substrate, i.e., the porosity of the partition wall 4 and the porosity of the circumferential wall 6, is the same.

The coat layer 3 is disposed on at least a part of the outer surface of the circumferential wall 6 of the honeycomb substrate 2. The coat layer 3 contains a material that can penetrate into the pores of the circumferential wall 6. Specifically, it is preferable to contain particles having an average particle diameter that is smaller than the average pore diameter of the circumferential wall 6, and a water repelling material. The material of the particles is not especially limited, and inorganic particles such as silicon carbide, silica, silicon nitride, cordierite, alumina, mullite, zirconia and the like are preferable, and particles containing Si (silicon) such as silicon carbide and silica are especially preferable. Furthermore, the kind of the water repelling material is also not especially limited, and is preferably a water repelling material containing Si such as silicone-based water repelling materials. Specific examples of the silicone-based water repelling materials include silicone oil and the like.

As shown in FIG. 3, in the present invention, a part of the coat layer 3 penetrates into pores 7 of the circumferential wall 6. FIG. 3 shows an exemplary embodiment in which the coat layer 3 containing particles 8 having an average particle diameter that is smaller than the average pore diameter of the circumferential wall 6 is disposed on the outer surface of the circumferential wall 6 of the honeycomb substrate 2. In this exemplary embodiment, the particles 8 contained in the coat layer 3 are in a state that they penetrate into the pores 7 of the circumferential wall 6.

Accordingly, since a part of the coat layer 3 penetrates into pores 7 of the circumferential wall 6 in the present invention, the pores 7 of the circumferential wall 6 are occluded. Therefore, even when a catalyst slurry is introduced into the cells 5 so that a catalyst is loaded on the partition wall 4 of the honeycomb structure 1 of the present invention, the slurry does not exude on the outer surface of the circumferential wall 6, and thus fine workability can be obtained in the step of loading a catalyst on the partition wall 4 of the honeycomb structure 1. Furthermore, since the circumferential wall 6 is reinforced by the coat layer 3, the strength of the circumferential wall 6 is improved, and thus the breakage of the circumferential wall 6 when a part of the circumferential wall 6 of the honeycomb structure 1 is chucked (gripped) in the step of loading a catalyst on the honeycomb structure 1 can be effectively prevented. Furthermore, as a result of the improvement of the strength of the circumferential wall 6, the isostatic strength of the entirety of the honeycomb structure 1 is improved, and thus the breakage of the honeycomb structure 1 during transportation and actual use can also be effectively prevented. Moreover, in the case when a coat layer containing a water repelling material is disposed, in addition to an effect of preventing the exuding of the catalyst slurry by the occlusion of the pores of the circumferential wall by the coat layer, an effect of preventing the exuding of the catalyst slurry by the repelling of the catalyst slurry by the water repelling material in the coat layer can be obtained.

In the present invention, a thickness T2 of a part 3b that penetrates into the pores 7 of the circumferential wall 6 of the coat layer 3 (hereinafter referred to as "penetrated part") is from 1 to 90%, preferably from 10 to 60%, especially preferably from 15 to 50% of a thickness T1 of the circumferential wall 6 of the honeycomb substrate 2 (see FIG. 3). If the thickness T2 of the penetrated part 3b of the coat layer 3 is from 1 to 90% of the thickness T1 of the circumferential wall 6, the pores 7 of the circumferential wall 6 can be effectively occluded even the honeycomb substrate 2 having a high porosity such that the porosity is 50% or more is used. In contrast to this, if the thickness T2 of the penetrated part 3b of the coat layer 3 is lower than 1% of the thickness T1 of the circumferential wall 6, in the case when the honeycomb substrate 2 having a high porosity such that the porosity is 50% or more is used, the occlusion of the pores 7 of the circumferential wall 6 is incomplete, and thus an effect of preventing the exuding of a catalyst slurry may not be obtained. Furthermore, if the thickness T2 of the penetrated part 3b of the coat layer 3 exceeds 90% of the thickness T1 of the circumferential wall 6, the coat layer 3 also penetrates into the pores of the partition wall 4, the loading of the catalyst into the pores of the partition wall 4 is disturbed, and thus the exhaust gas purifying performance may deteriorate. The thickness of the penetrated part 3b of the coat layer 3 was observed by a SEM (scanning electron microscope), and measured.

Furthermore, in the present invention, a remaining part 3a other than the part that penetrates in the pores 7 of the circumferential wall 6 (hereinafter referred to as "non-penetrated part") of the coat layer 3 has a thickness T3 of preferably 70 μm or less, more preferably 8 μm or less (see FIG. 3). If the thickness T3 of the non-penetrated part 3a of the coat layer 3 exceeds 70 μm, cracks may be generated on the coat layer 3. The lower limit of the thickness T3 of the non-penetrated part 3a of the coat layer 3 is not especially limited, but the value of the lower limit is preferably about 5 μm with consideration for easiness of production, and the like. The thickness of the non-penetrated part 3a of the coat layer 3 was observed by a SEM (scanning electron microscope), and measured.

In the present invention, the coat layer 3 may be disposed on either the entirety or a part of the outer surface of the circumferential wall 6 of the honeycomb substrate 2. For example, in the exemplary embodiment shown in FIGS. 1 and 2, in the outer surface of the circumferential wall 6 of the honeycomb substrate 2, the coat layer 3 is disposed in a band-like manner on the part other than the vicinities of the both end faces (inlet end face 11 and outlet end face 12) of the honeycomb substrate 2. This is an exemplary embodiment in which the catalyst is expected to be loaded on the honeycomb structure 1 in the state that the parts in the vicinities of the both end faces of the honeycomb substrate 2 are chucked (gripped). Specifically, in the case when the catalyst slurry is introduced into the cells 5 under such state, the catalyst slurry does not exude from the chucked parts in the outer surface of the circumferential wall 6 of the honeycomb substrate 2, and thus the workability in the step of loading the catalyst is not deteriorated even if the coat layer 3 is not disposed on that parts.

It is preferable that the coat layer 3 contains Si (silicon). In this case, Si may be contained in the coat layer in the state of particles such as SiC particles and $SiO_2$ particles, or may be contained as a component of a water repelling material such as a silicone-based water repelling material. Since Si is contained in the coat layer 3, the effect of preventing the exuding of the catalyst slurry is improved. The amount of the Si contained in the coat layer 3 is preferably from 10 to 30% by mass with respect to the entirety of the coat layer 3. If the amount of the Si contained in the coat layer 3 is less than 10% by mass with respect to the entirety of the coat layer 3, an action of improving the effect of preventing the exuding of the catalyst slurry may not be sufficiently exerted. Alternatively, if the amount of the Si contained in the coat layer 3 is more than 30% by mass with respect to the entirety of the coat layer 3, the thermal shock resistance of the coat layer 3 may decrease.

Furthermore, it is preferable that the coat layer 3 further contains Ti (titanium). In order to make the production control of the honeycomb structure easy, information such as size and mass is sometimes displayed on the circumferential surface by a barcode or the like. As a method for displaying information, a method including irradiating a circumferential surface of a honeycomb structure with laser light (laser marking) is widely used. In this case, when the surface of a material containing Ti is irradiated with laser light, the irradiated part comes out black. Therefore, if information is displayed by a method including irradiating the surface of a coat layer containing Ti with laser light, the information can be displayed at a high contrast, and thus a read rate when the information is read by a barcode reader or the like is improved. The amount of the Ti contained in the coat layer 3 is preferably from 10 to 30% by mass with respect to the entirety of the coat layer 3. If the amount of the Ti contained in the coat layer 3 is lower than 10% by mass with respect to the entirety of the coat layer 3, when information is displayed (printed) by laser marking, the printing becomes light (the part irradiated with the laser light does not sufficiently develop a color), and thus an action to improve the rate of reading of information may not be sufficiently exerted. Furthermore, if the amount of the T1 contained in the coat layer 3 is more than 30% by mass of the entirety of the coat layer 3, the thickness of the thickness T2 of the penetrated part 3b may become thick and the coating property may deteriorate.

The problems of exuding of the catalyst slurry on the outer surface of the circumferential wall and an insufficient strength become significant especially in a honeycomb structure having a high porosity such that the porosity is 50% or more. Therefore, the present invention is highly useful in the case when a honeycomb substrate having a porosity of from 50 to 75%, and is especially useful in the case when a honeycomb substrate having a porosity of from 59 to 67% is used. The "porosity" as mentioned herein is a value measured by means of a mercury porosimeter. Furthermore, typical use of such honeycomb structure having a high porosity includes a GPF of a type used by loading a catalyst. Therefore, the honeycomb structure of the present invention can be especially preferably used in such GPF. However, the honeycomb structure of the present invention is not limited to such GPF, and can be widely used in various filters, catalyst carriers and the like.

As the material for the honeycomb substrate 2, ceramic materials such as silicon carbide, silicon-silicon carbide-based composite materials, cordierite, mullite, alumina, spinel, silicon carbide-cordierite-based composite materials, lithium aluminum silicate and aluminum titanate are preferable. Among these, cordierite is especially preferable. This is because, if the material of the honeycomb substrate 2 is cordierite, a honeycomb structure having a small thermal expansion coefficient and an excellent thermal shock resistance can be obtained.

The honeycomb substrate 2 (partition wall 4 and circumferential wall 6) has an average pore diameter of preferably from 10 to 30 μm, especially preferably from 15 to 25 μm. If the average pore diameter of the honeycomb substrate 2 is lower than 10 μm, the pressure loss of the honeycomb structure 1 becomes too high, and thus decrease in an output of an engine may be caused when the honeycomb structure is used as a GPF. Furthermore, if the average pore diameter of the honeycomb substrate 2 exceeds 30 μm, a sufficient strength may not be obtained. The "average pore diameter" as used herein is a value measured by means of a mercury porosimeter.

The partition wall 4 of the honeycomb substrate 2 has a thickness of preferably from 150 to 350 μm, especially preferably from 200 to 310 μm. If the thickness of the partition wall 4 is lower than 150 μm, a sufficient strength may not be obtained. Alternatively, if the thickness of the partition wall 4 exceeds 350 μm, the pressure loss of the honeycomb structure 1 becomes too high, and thus decrease in an output of an engine may be caused when the honeycomb structure is used as a GPF.

The circumferential wall 6 of the honeycomb substrate 2 has a thickness of preferably from 300 to 1,000 μm, especially preferably from 500 to 800 μm. If the thickness of the circumferential wall 6 is lower than 300 μm, a sufficient strength may not be obtained. Alternatively, if the thickness of the circumferential wall 6 exceeds 1,000 μm, the pressure loss of the honeycomb structure 1 becomes too high, and thus decrease in an output of an engine may be caused when the honeycomb structure is used as a GPF.

The honeycomb substrate 2 has a cell density of preferably from 232.5 to 620.0 cell/cm$^2$, especially preferably from 310.0 to 465.0 cell/cm$^2$. If the cell density is lower than 232.5 cell/cm$^2$, an effective surface area as a filter is insufficient in the case of use as a GPF, and thus the pressure loss after the deposition of PM may become high, and thus decrease in an output of an engine may be caused. Furthermore, if the cell density exceeds 620.0 cell/cm$^2$, the pressure loss becomes too high, and thus decrease in an output of an engine may be caused in the case of use as a GPF.

The shape (outer shape) of the honeycomb substrate 2 is not especially limited, and for example, can be a round pillar-shape, an oval pillar-shape, a polygonal pillar-shape or the like. Furthermore, the shape in the cross-sectional surface that is vertical to the longitudinal direction of the honeycomb substrate 2 of the cell 5 (hereinafter referred to as "cell shape") is also not especially limited, and is preferably a polygonal shape such as a square shape, a hexagonal shape or an octagonal shape, or a combination thereof such as a combination of a square shape and an octagonal shape, or the like.

Figure 4:
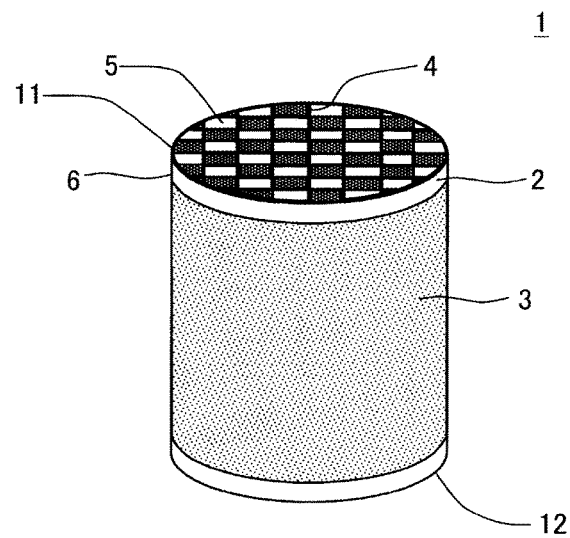
FIG. 4 is a perspective view that schematically shows another exemplary embodiment of a honeycomb structure of the present invention.
Figure 5:
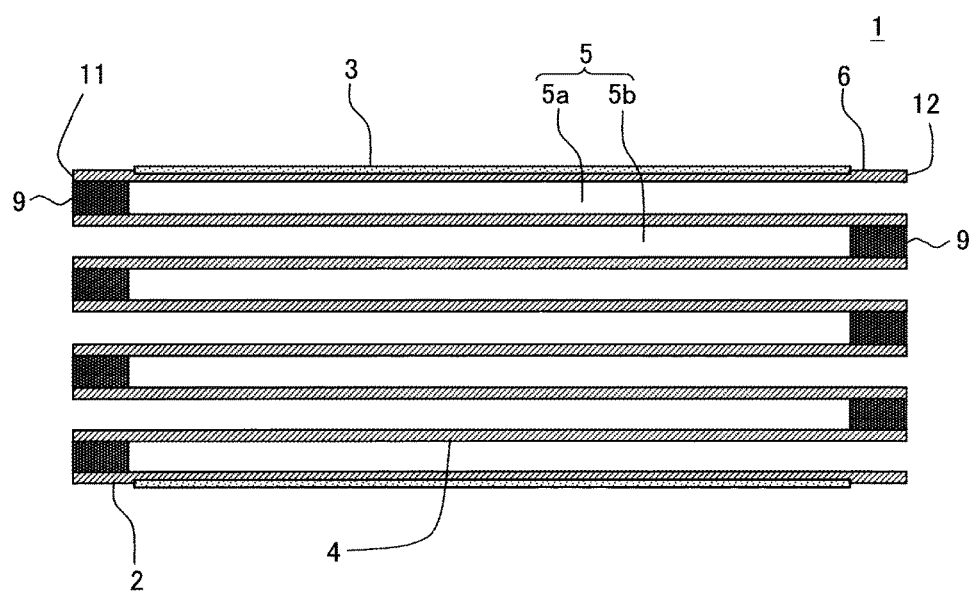
FIG. 5 is a schematic view showing a cross-sectional surface that is in parallel with the direction to which cells extend in the other exemplary embodiment of the honeycomb structure of the present invention.

In the case when the honeycomb structure 1 of the present invention is used in a PM trapping filter such as a GPF, as shown in FIGS. 4 and 5, it is preferable to form plugging portions 9 that are configured to plug the open ends of the predetermined cells 5a at the side of the inlet end face 11 and the open ends of the residual cells 5b at the side of the outlet end face 12. By plugging one open end of each cell 5 of the honeycomb substrate 2 by the plugging portion 9 in this way, the honeycomb structure 1 becomes a wall flow type filter having a high PM trap efficiency. In this wall flow type filter, an exhaust gas that has flown into the cells 5 from the inlet end face 11 passes through the partition wall 4 and then flows out of the cells 5 from the outlet end face 12. Furthermore, during the passage of the exhaust gas in the partition wall 4, the partition wall 4 functions as a filtration layer, and thus the PM contained in the exhaust gas is trapped. It is preferable that the inlet end face 11 and the outlet end face 12 are respectively formed so as to give an arrangement that gives a checkerboard pattern by the cells 5 of which open ends are plugged by the plugging portions 9 and the cells 5 of which open ends are not plugged by the plugging portions 9.

The material of the plugging portions 9 is preferably a material that is deemed as a preferable material for the honeycomb substrate 2. The material of the plugging portion 9 and the material of the honeycomb substrate 2 may be the same material or different materials.

The honeycomb structure 1 of the present invention is supposed to be used by loading a catalyst on the partition wall 4 of the honeycomb substrate 2. The kind of the catalyst to be loaded on the partition wall 4 of the honeycomb substrate 2 is not especially limited, and for example, in the case when the honeycomb structure is used for purifying an exhaust gas from an automobile, it is preferable to use a precious metal. As the precious metal, platinum, rhodium or palladium, or a combination thereof is preferable. The loading amount of these precious metals is preferably from 0.3 to 3.5 g/L per a unit volume of the honeycomb structure 1.

In order to load the catalyst such as a precious metal on the partition wall 4 in a highly dispersed state, it is preferable to load the catalyst once on a heat-resistant inorganic oxide having a large specific surface area such as alumina in advance, and then load the catalyst on the partition wall 4 of the honeycomb substrate 2. As the heat-resistant inorganic oxide on which the catalyst is to be loaded, zeolite or the like can also be used depending on use besides alumina. Furthermore, the catalyst such as a precious metal may be loaded on the partition wall 4 of the honeycomb substrate 2 after being fixed on a co-catalyst composed of ceria, zirconia, or a composite oxide thereof or the like.

The honeycomb structure of the present invention may be such that the circumferential wall of the honeycomb substrate has been separately formed from the partition wall, rather than formed monolithically with the partition wall. The "has been separately formed from the partition wall" herein means that the formation of the part that becomes the circumferential wall of the honeycomb substrate is conducted after the formation of the part that becomes the partition wall in the step of production of the honeycomb substrate. As mentioned above, also in the case when the catalyst is loaded on the partition wall of the honeycomb structure in which the partition wall and the circumferential wall have been separately formed, if the circumferential wall has a porosity of 35% or more, the catalyst slurry that has been introduced in the cells may exude on the outer surface of the circumferential wall. However, if a predetermined coat layer has been disposed as in the present invention, the exuding of the catalyst slurry can be effectively prevented also in the case when the circumferential wall of the honeycomb substrate that constitutes the honeycomb structure has been formed separately from the partition wall and the circumferential wall has a porosity of 35% or more.

In the case when the circumferential wall of the honeycomb substrate has been formed separately from the partition wall, the porosity of the circumferential wall and the porosity of the partition wall may the same or different. Furthermore, in this case, the average pore diameter of the circumferential wall and the average pore diameter of the partition wall may the same or different. Furthermore, in this case, the material of the circumferential wall and the material of the partition wall may the same or different. The "porosity" and "average pore diameter" as mentioned herein are values measured by a mercury porosimeter.

(2) Method for Producing Honeycomb Structure:

An example of the method for producing the honeycomb structure according to the present invention will be explained. Firstly, in order to prepare a honeycomb substrate, a forming raw material containing a ceramic raw material is prepared. The ceramic raw material is preferably at least one kind selected from the group consisting of silicon carbide, silicon-silicon carbide-based composite materials, cordierite forming raw materials, mullite, alumina, spinel, silicon carbide-cordierite-based composite materials, lithium aluminum silicate and aluminum titanate. Among these, cordierite forming raw materials, which have a small thermal expansion coefficient and an excellent thermal shock resistance, are preferable. The cordierite forming raw materials are ceramic raw materials in which silica, alumina and magnesia are incorporated so as to give a chemical composition wherein the silica is within a scope of from 42 to 56% by mass, the alumina is within a scope of from 30 to 45% by mass, and the magnesia is within a scope of from 12 to 16% by mass. The cordierite forming raw materials give cordierite by being fired.

It is preferable to prepare the forming raw material by mixing the ceramic raw material as mentioned above with a dispersing medium, an organic binder, an inorganic binder, a pore former, a surfactant and the like. The composition ratio of the respective raw materials is not especially limited, and a composition rate in accordance with the structure, material and the like of a honeycomb substrate to be prepared is preferable.

Secondly, a kneaded material is formed by kneading the forming raw material. The method for forming a kneaded material by kneading the forming raw material is not especially limited. Examples of preferable methods can include methods using a kneader, a vacuum pugmill and the like.

Secondly, a honeycomb formed body in which a partition wall and a circumferential wall are formed monolithically is formed by extrusion from the kneaded material by using a die in which grid-like slits are formed, and the honeycomb formed body is dried. The drying method is not especially limited. Examples of preferable drying methods can include hot air drying, microwave drying, dielectric drying, drying under a reduced pressure, vacuum drying, freeze drying and the like. Among these, dielectric drying, microwave drying, hot air drying are preferably used singly or in combination.

Secondly, the dried honeycomb formed body (honeycomb dried form) is fired to prepare a honeycomb substrate. In order to remove the binder and the like contained in the honeycomb formed body, it is preferable to conduct calcination (degreasing) before this firing (main firing). The conditions for the calcination are not especially limited, and the conditions may be such conditions that the organic substances (organic binder, surfactant, pore former and the like) contained in the honeycomb formed body can be removed. Generally, the combustion temperature of the organic binder is from about 100 to 300° C., and the combustion temperature of the pore former is from about 200 to 800° C. Therefore, as the conditions for the calcination, it is preferable to heat under an oxidation atmosphere at from about 200 to 1,000° C. for from about 3 to 100 hours. Since the conditions for the firing (main firing) of the honeycomb formed body (temperature, time, atmosphere and the like) differ depending on the kind of the forming raw material, suitable conditions may be selected depending on the kind. For example, in the case when a cordierite forming raw material is used, the firing temperature is preferably from 1,410 to 1,440° C. Furthermore, the firing time is preferably set to about from 4 to 8 hours as a keep time at the highest temperature. The apparatus for conducting the calcination and main firing is not especially limited. Examples of preferable apparatuses can include an electric furnace, a gas furnace and the like.

In the case when a honeycomb structure having plugging portions is prepared, plugging portions are formed on a honeycomb substrate. The plugging portions are formed so as to plug the open ends of the predetermined cells at the side of one end face (an inlet end face) and the open ends of the residual cells at the side of another end face (an outlet end face). For the formation of these plugging portions, a conventionally-known method can be used. An example of a specific method is as follows. Firstly, a sheet is attached to an end face of a honeycomb substrate prepared by the method as mentioned above. Secondly, holes are opened on the positions on this sheet which correspond to the cells on which plugging portions are to be formed. Secondly, the end face of the honeycomb substrate is immersed in a plugging slurry, which is a material for forming plugging portions in the form of a slurry, in the state that this sheet is attached, whereby the open ends of the cells to be plugged are filled with the plugging slurry through the holes opened on the sheet. The plugging slurry filled in this way is dried, and cured by firing, whereby the plugging portions are formed. As the material for forming the plugging portions, the same material as the material that forms the honeycomb substrate is preferably used. The plugging portions may be formed at any stage, after the drying of the honeycomb formed body, after the calcination or after the firing (main firing).

Secondly, a slurry for forming a coat layer, which contains particles having a smaller average particle diameter than the average pore diameter of the circumferential wall of the honeycomb substrate prepared in this way, is prepared. As the particles to be incorporated in the slurry for forming a coat layer, inorganic particles of silicon carbide, silica, silicon nitride, cordierite, alumina, mullite, zirconia and the like are preferable, and particles containing Si such as silicon carbide and silica are especially preferable. Preferably the slurry for forming a coat layer contains, in addition to such particles, a bonding material capable of binding the particles to the inner surfaces of the pores of the circumferential wall, and is obtained by diluting those with water. Moreover, a dispersing agent and a defoaming agent may further be suitably incorporated in the slurry or forming a coat layer. As the bonding material, colloidal sols such as silica sol and alumina sol, and laminar compounds that show bonding property by swelling, and the like can be preferably used.

A coat layer is disposed by applying such slurry for forming a coat layer onto the outer surface of the circumferential wall of the honeycomb substrate, and drying. When the slurry for forming a coat layer is applied, in order that a part of the slurry penetrates into the pores of the circumferential wall, and a thickness of the penetrated part is from 1 to 90% of the thickness of the circumferential wall, the control of the thickness of the penetrated part is carried out. For example, in the case when the slurry for forming a coat layer is applied by using a roller, the above-mentioned control can be conducted by the pressure in pressing the roller against the circumferential wall, the rotation number of the roller, and the like. In addition, the coat layer may also be disposed by applying a water repelling material, instead of the slurry for forming a coat layer, to the outer surface of the circumferential wall of the honeycomb substrate, and subjecting the water repelling material to a curing treatment by heating, irradiation with light, or the like. In this case, as the water repelling material, those containing Si such as silicone-based water repelling materials are preferable. Furthermore, in the case when the coat layer is disposed on a part of the outer surface of the circumferential wall, it is preferable to mask the part on which the coat layer is not to be formed on the outer surface of the circumferential wall with a tape or the like, and then apply the slurry for forming a coat layer or the water repelling material.

By forming the coat layer on the outer surface of the circumferential wall of the honeycomb substrate in this way, the honeycomb structure of the present invention can be obtained. In the case when a catalyst is loaded on the honeycomb structure of the present invention, it is preferable to attach a catalyst slurry containing a catalyst such as a precious metal to the surface and pores of the partition wall by using a conventionally-known catalyst loading method such as an aspiration method, and subjecting the catalyst slurry to a high temperature treatment to bake the catalyst contained in the catalyst slurry on the partition wall.

EXAMPLES

The present invention will further be explained below in more detail based on Examples, but the present invention is not construed to be limited to these Examples.

Examples 1 to 20 and Comparative Examples 1 and 2

A pore former, a binder, a surfactant and water were added to a cordierite forming raw material containing talc, kaolin and alumina as major raw materials to prepare a forming raw material, and the forming raw material was kneaded in a vacuum pugmill to give a kneaded material. Starch was used as the pore former. Furthermore, methyl cellulose and hydroxypropoxymethyl cellulose were used as the binder. Sodium laurate was used as the surfactant. The addition amounts of the respective raw materials were 5 parts by mass of the pore former, 3 parts by mass of the methyl cellulose, 3 parts by mass of the hydroxypropoxymethyl cellulose, 1 part by mass of the surfactant, and 32 parts by mass of water with respect to 100 parts by mass of the cordierite forming raw material.

The obtained kneaded material was subjected to extrusion molding by using a honeycomb body forming die, whereby pillar-shaped honeycomb formed bodies, each of which had a partition wall that had defined a plurality of cells extending from an inlet end face as an inlet side for a fluid to an outlet end face as an outlet side for the fluid, and a circumferential wall that had been formed monolithically with the partition wall, was obtained. Thereafter these honeycomb formed bodies were dried by microwave and hot air to give honeycomb dried forms.

Subsequently, plugging portions were formed on one open ends of the respective cells of these honeycomb dried forms. The plugging portions were formed so that the respective end faces of each of the dried forms gave a checkerboard pattern by the cells having plugging portions formed on the open ends and the cells having no plugging portions formed on the open ends. The method for forming the plugging portions was as follows. Firstly, a sheet was attached to the end face of each of the dried forms, and holes were formed on the positions on this sheet which correspond to the cells on which plugging portions were to be formed. Secondly, the end face of each of the dried forms was immersed in a plugging slurry, which was a material for forming plugging portions in the form of a slurry, in the state that this sheet was attached, whereby the open ends of the cells to be plugged were filled with the plugging slurry through the holes formed on the sheet. As the material for forming the plugging portions, the same material as the above-mentioned forming raw material was used.

The plugging slurry that was filled in the open ends of the cells in this way was dried, and these honeycomb dried forms were calcined (degreased) in an atmospheric atmosphere at about 400° C. The honeycomb dried forms were then fired at about 1,450° C., whereby honeycomb substrates each having a circumferential wall and a partition wall that were formed monolithically were obtained. The obtained honeycomb substrates each had a round pillar-shape having a diameter of 118.4 mm and a length of 127.0 mm, had cells each having a square shape, and the other structures were as shown in Table 1.

Subsequently, 25 parts by mass of $TiO_2$ and 25 parts by mass of SiC were added to 50 parts by mass of colloidal silica particles having an average particle diameter of 0.002 μm, and thoroughly stirred to prepare a slurry for forming a coat layer. This slurry for forming a coat layer was applied in a band-like manner on the part other than the vicinities of the both end faces, of the outer surface of the circumferential wall of each of the honeycomb substrates. Each of the honeycomb substrates was then dried, and a coat layer such that the penetrated part and non-penetrated part had thicknesses of the values shown in Table 1 was disposed thereon. In this way, the honeycomb structures of Examples 1 to 20 and Comparative Examples 1 and 2 were obtained. The slurry for forming a coat layer was applied by using a roller, and the thicknesses of the penetrated part and non-penetrated part were controlled by the pressure for pressurizing the roller against the circumferential wall of each of the honeycomb substrates, the rotation number of the roller, and the like.

Examples 21 to 40 and Comparative Examples 3 and 4

Kneaded materials obtained in a similar manner to that in the above-mentioned Examples 1 to 20 and Comparative Examples 1 and 2 were each subjected to extrusion molding by using a honeycomb body forming die to give honeycomb formed bodies each having a partition wall defining a plurality of cells that extend from an inlet end face as an inlet side for a fluid to an outlet end face as an outlet side for the fluid. Thereafter these honeycomb formed bodies were dried by microwave and hot air to give honeycomb dried forms.

Secondly, one open end of each of the cells in these honeycomb dried forms was filled with a plugging slurry in a similar manner to that in the above-mentioned Examples 1 to 20 and Comparative Examples 1 and 2 to form plugging portions. The plugging slurry filled in the open ends of the cells was dried, and these honeycomb dried forms were calcined (degreased) under an atmospheric atmosphere at about 400° C. The honeycomb dried forms were then fired at about 1,450° C. to give honeycomb fired forms. Secondly, the circumferences of the honeycomb fired forms were subjected to grinding so that the outer shape of each honeycomb fired form became a round pillar-shape. After the grinding, a circumferential wall-forming material composed of the same material as the above-mentioned forming raw material was applied to the grinded surface and cured by drying at 700° C. for 2 hours to form a circumferential wall, whereby honeycomb substrates each having the circumferential wall and a partition wall that had been separately formed were obtained. The obtained honeycomb substrates each had a round pillar-shape having a diameter of 118.4 mm and a length of 127.0 mm and had square-shaped cells, and the other structures were as shown in Table 2.

Subsequently, a slurry for forming a coat layer that was obtained in a similar manner to that in the above-mentioned Examples 1 to 20 and Comparative Examples 1 and 2 was applied in a band-like manner on the part other than the vicinities of the both end faces in the outer surface of the circumferential wall of each of the honeycomb substrates. Thereafter the honeycomb substrates were dried, and coat layers such that the thicknesses of the penetrate parts and non-penetrate parts became the values shown in Table 2 were disposed thereon to give the honeycomb structures of Examples 21 to 40 and Comparative Examples 3 and 4. The slurry for forming a coat layer was applied by using a roller, and the thicknesses of the penetrated part and non-penetrated part were controlled by the pressure for pressurizing the roller against the circumferential wall of each of the honeycomb substrates, the rotation number of the roller, and the like.

TABLE 1

| | | Honeycomb substrate | | | | | | Coat layer | | |
| --- | --- | --- | --- | --- | --- | --- | --- | --- | --- | --- |
| | Form of circumferential wall | Porosity *1 (%) | Average pore diameter (μm) | Thickness of partition wall (μm) | Cell pitch (mm) | Thickness of circumferential wall (μm) | Cell density (cell/cm$^2$) | Thickness of penetrated part (μm) | Rate of thickness of penetrated part with respect to thickness of circumferential wall (%) | Thickness of non-penetrated part (μm) |
| Example 1 | Formed monolithically with partition wall | 65 | 20 | 305 | 1.47 | 1000 | 46.5 | 800 | 80.0 | 4 |
| Example 2 | Formed monolithically with partition wall | 65 | 20 | 305 | 1.47 | 1000 | 46.5 | 600 | 60.0 | 4 |
| Example 3 | Formed monolithically with partition wall | 65 | 20 | 305 | 1.47 | 1000 | 46.5 | 100 | 10.0 | 4 |
| Example 4 | Formed monolithically with partition wall | 50 | 20 | 305 | 1.47 | 1000 | 46.5 | 800 | 80.0 | 4 |
| Example 5 | Formed monolithically with partition wall | 70 | 20 | 305 | 1.47 | 1000 | 46.5 | 800 | 80.0 | 4 |
| Example 6 | Formed monolithically with partition wall | 50 | 10 | 305 | 1.47 | 1000 | 46.5 | 900 | 90.0 | 4 |
| Example 7 | Formed monolithically with partition wall | 65 | 10 | 305 | 1.47 | 1000 | 46.5 | 800 | 80.0 | 4 |

TABLE 1-continued

|  | Honeycomb substrate | | | | | | | Coat layer | | |
|---|---|---|---|---|---|---|---|---|---|---|
|  | Form of circumferential wall | Porosity *1 (%) | Average pore diameter (μm) | Thickness of partition wall (μm) | Cell pitch (mm) | Thickness of circumferential wall (μm) | Cell density (cell/cm²) | Thickness of penetrated part (μm) | Rate of thickness of penetrated part with respect to thickness of circumferential wall (%) | Thickness of non-penetrated part (μm) |
| Example 8 | Formed monolithically with partition wall | 65 | 20 | 305 | 1.47 | 700 | 46.5 | 560 | 80.0 | 4 |
| Example 9 | Formed monolithically with partition wall | 65 | 20 | 254 | 1.47 | 600 | 46.5 | 480 | 80.0 | 4 |
| Example 10 | Formed monolithically with partition wall | 65 | 20 | 241 | 1.64 | 400 | 37.2 | 320 | 80.0 | 4 |
| Example 11 | Formed monolithically with partition wall | 65 | 20 | 203 | 1.34 | 400 | 55.8 | 320 | 80.0 | 4 |
| Example 12 | Formed monolithically with partition wall | 65 | 20 | 203 | 1.47 | 400 | 46.5 | 320 | 80.0 | 4 |
| Example 13 | Formed monolithically with partition wall | 65 | 20 | 305 | 1.47 | 1000 | 46.5 | 800 | 80.0 | 8 |
| Example 14 | Formed monolithically with partition wall | 65 | 20 | 305 | 1.47 | 1000 | 46.5 | 800 | 80.0 | 15 |
| Example 15 | Formed monolithically with partition wall | 65 | 20 | 305 | 1.47 | 1000 | 46.5 | 50 | 5.0 | 4 |
| Example 16 | Formed monolithically with partition wall | 65 | 20 | 305 | 1.47 | 1000 | 46.5 | 800 | 80.0 | 70 |
| Example 17 | Formed monolithically with partition wall | 65 | 20 | 305 | 1.47 | 1000 | 46.5 | 15 | 1.5 | 4 |
| Example 18 | Formed monolithically with partition wall | 65 | 20 | 305 | 1.47 | 1000 | 46.5 | 800 | 80.0 | 30 |
| Example 19 | Formed monolithically with partition wall | 65 | 20 | 305 | 1.47 | 1000 | 46.5 | 800 | 80.0 | 60 |
| Example 20 | Formed monolithically with partition wall | 65 | 20 | 305 | 1.47 | 1000 | 46.5 | 800 | 80.0 | 75 |
| Comparative Example 1 | Formed monolithically with partition wall | 65 | 20 | 305 | 1.47 | 1000 | 46.5 | 930 | 93.0 | 4 |
| Comparative Example 2 | Formed monolithically with partition wall | 65 | 20 | 305 | 1.47 | 1000 | 46.5 | 5 | 0.5 | 4 |

*1: The porosity of the entirety of the honeycomb substrate (the partition wall and the circumferential wall)

TABLE 2

|  | Honeycomb substrate | | | | | | | | Coat layer | | |
|---|---|---|---|---|---|---|---|---|---|---|---|
|  | Form of circumferential wall | Porosity of circumferential wall (%) | Porosity of partition wall (%) | Average pore diameter (μm) | Thickness of partition wall (μm) | Cell pitch (mm) | Thickness of circumferential wall (μm) | Cell density (cell/cm²) | Thickness of penetrated part (μm) | Rate of thickness of penetrated part with respect to thickness of circumferential wall (%) | Thickness of non-penetrated part (μm) |
| Example 21 | Formed separately from partition wall | 40 | 65 | 20 | 305 | 1.47 | 2000 | 46.5 | 1600 | 80.0 | 4 |
| Example 22 | Formed separately from partition wall | 40 | 65 | 20 | 305 | 1.47 | 2000 | 46.5 | 1000 | 50.0 | 4 |
| Example 23 | Formed separately from partition wall | 40 | 65 | 20 | 305 | 1.47 | 2000 | 46.5 | 400 | 20.0 | 4 |
| Example 24 | Formed separately from partition wall | 40 | 40 | 20 | 305 | 1.47 | 2000 | 46.5 | 1600 | 80.0 | 4 |
| Example 25 | Formed separately from partition wall | 40 | 70 | 20 | 305 | 1.47 | 2000 | 46.5 | 1600 | 80.0 | 4 |
| Example 26 | Formed separately from partition wall | 40 | 50 | 15 | 305 | 1.47 | 2000 | 46.5 | 1600 | 80.0 | 4 |
| Example 27 | Formed separately from partition wall | 40 | 40 | 10 | 305 | 1.47 | 2000 | 46.5 | 1600 | 80.0 | 4 |
| Example 28 | Formed separately from partition wall | 40 | 65 | 20 | 305 | 1.47 | 1400 | 46.5 | 1120 | 80.0 | 4 |
| Example 29 | Formed separately from partition wall | 40 | 65 | 20 | 254 | 1.47 | 1800 | 46.5 | 1440 | 80.0 | 4 |
| Example 30 | Formed separately from partition wall | 40 | 65 | 20 | 241 | 1.64 | 1000 | 37.2 | 800 | 80.0 | 4 |

TABLE 2-continued

| | Form of circumferential wall | Honeycomb substrate | | | | | | | Coat layer | | |
|---|---|---|---|---|---|---|---|---|---|---|---|
| | | Porosity of circumferential wall (%) | Porosity of partition wall (%) | Average pore diameter (µm) | Thickness of partition wall (µm) | Cell pitch (mm) | Thickness of circumferential wall (µm) | Cell density (cell/cm$^2$) | Thickness of penetrated part (µm) | Rate of thickness of penetrated part with respect to thickness of circumferential wall (%) | Thickness of non-penetrated part (µm) |
| Example 31 | Formed separately from partition wall | 40 | 65 | 20 | 203 | 1.34 | 1000 | 55.8 | 800 | 80.0 | 4 |
| Example 32 | Formed separately from partition wall | 40 | 65 | 20 | 203 | 1.47 | 1000 | 46.5 | 800 | 80.0 | 4 |
| Example 33 | Formed separately from partition wall | 40 | 65 | 20 | 305 | 1.47 | 2000 | 46.5 | 1600 | 80.0 | 10 |
| Example 34 | Formed separately from partition wall | 40 | 65 | 20 | 305 | 1.47 | 2000 | 46.5 | 1600 | 80.0 | 50 |
| Example 35 | Formed separately from partition wall | 40 | 65 | 20 | 305 | 1.47 | 2000 | 46.5 | 1600 | 80.0 | 70 |
| Example 36 | Formed separately from partition wall | 40 | 65 | 20 | 305 | 1.47 | 2000 | 46.5 | 1600 | 80.0 | 75 |
| Example 37 | Formed separately from partition wall | 40 | 65 | 20 | 305 | 1.47 | 2000 | 46.5 | 1000 | 50.0 | 4 |
| Example 38 | Formed separately from partition wall | 40 | 65 | 20 | 305 | 1.47 | 2000 | 46.5 | 400 | 20.0 | 4 |
| Example 39 | Formed separately from partition wall | 40 | 65 | 20 | 305 | 1.47 | 2000 | 46.5 | 200 | 10.0 | 4 |
| Example 40 | Formed separately from partition wall | 40 | 65 | 20 | 305 | 1.47 | 2000 | 46.5 | 100 | 5.0 | 4 |
| Comparative Example 3 | Formed separately from partition wall | 40 | 65 | 20 | 305 | 1.47 | 2000 | 46.5 | 1860 | 93.0 | 4 |
| Comparative Example 4 | Formed separately from partition wall | 40 | 65 | 20 | 305 | 1.47 | 2000 | 46.5 | 10 | 0.5 | 4 |

(Evaluation)

For the honeycomb structures of Examples 1 to 40 and Comparative Examples 1 to 4, "an effect for preventing the exuding of the catalyst slurry", "an exhaust gas purifying performance", "the presence or absence of cracks on the coat layer" and "the strength of the circumferential wall" were evaluated by the following methods, and the results thereof were shown in Tables 3 and 4.

[Effect for Preventing Exuding of Catalyst Slurry]

1,200 parts by mass of Al$_2$O$_3$, 300 parts by mass of CeO$_2$, 1 part by mass of Pt and 15,000 parts by mass of water were mixed, and the mixture was subjected to wet pulverization to prepare a catalyst slurry having a viscosity of about 2 mPa·s. The inlet end face of the honeycomb structure was immersed in the catalyst slurry in the state that the parts in the vicinities of the both end faces of the honeycomb structure (the parts on which the coat layer was not disposed) were chucked. The catalyst slurry was introduced into the cells with aspiration from the outlet end face, whereby the catalyst slurry was attached to the partition wall. Furthermore, the upper and lower surfaces of the honeycomb structure were reversed, and the outlet end face of the honeycomb structure was immersed in the catalyst slurry, and the catalyst slurry was introduced into the cells with aspiration from the inlet end face, whereby the catalyst slurry was attached to the partition wall. Furthermore, whether or not the catalyst slurry had exuded on the outer surface of the circumferential wall of the honeycomb structure when the catalyst slurry was introduced into the cell with aspiration in this way was examined. As to results of the examination, the case when the catalyst slurry, including the water contained in the catalyst slurry, did not exude was deemed as "excellent", the case when only the water contained in the catalyst slurry exuded was deemed as "acceptable", and the case when Al$_2$O$_3$ and CeO$_2$, which are the components of the catalyst slurry, exuded was deemed as "not acceptable".

(Exhaust Gas Purification Performance)

The catalyst slurry that had been attached to the partition wall of the honeycomb structure as mentioned above was dried at 120° C. for 2 hours and heated at 550° C. for 1 hour to bake the catalyst contained in the catalyst slurry on the partition wall. Furthermore, honeycomb structures on which a coat layer had not been disposed were prepared in similar manners to those in Examples 1 to 40 and Comparative Examples 1 to 4, except that a coat layer was not disposed, and a catalyst was baked on the partition wall in a similar manner. In this way, a catalyst was loaded on each of the honeycomb structures of Examples 1 to 40 and Comparative Examples 1 to 4 on which a coat layer had been disposed, and on each of the honeycomb structures that were similar to those of Examples 1 to 40 and Comparative Examples 1 to 4 except that a coat layer was not disposed. A purification rate when each of these honeycomb structures purifies NO contained in an exhaust gas in running at a NEDC mode by a direct injection type gasoline engine of stoichiometric combustion at a displacement of 1.4 L was measured. Furthermore, the case when the purification rate of NO of the honeycomb structure on which a coat layer had been disposed was 90% or more of the purification rate of NO of the honeycomb structure on which a coat layer had not been disposed was deemed as "excellent". Furthermore, the case when the purification rate of NO of the honeycomb structure on which a coat layer had been disposed was lower than 90% of the purification rate of NO of the honeycomb structure on which a coat layer had not been disposed was deemed as "not acceptable".

(Presence or Absence of Cracks on Coat Layer)

The coat layer of the honeycomb structure was observed by visual observation, and the presence or absence of cracks was examined. Furthermore, the case when cracks were absent on the coat layer was deemed as "excellent", and the case when the presence of cracks on the coat layer was confirmed, but the cracks did not extend to the honeycomb substrate was deemed as "acceptable".

(Strength of Circumferential Wall)

The strength of the circumferential wall of each of the honeycomb structures of Examples 1 to 40 and Comparative Examples 1 to 4 before the coat layer was disposed, and the strength of the circumferential wall of each of the honeycomb structures of Examples 1 to 40 and Comparative Examples 1 to 4 after the coat layer had been disposed were measured. The strength of the circumferential wall was measured, by such a method that a spherical weight made of alumina was vertically dropped on the circumferential wall of the honeycomb structure. Specifically, the dropping was repeated with changing the weight of the weight and the dropping distance, until breakage occurred on the circumferential wall of the honeycomb structure by the impact of the dropping of the weight, and an impact energy was calculated from the weight of the weight and the dropping distance when breakage occurred on the circumferential wall, and deemed as "the strength of the circumferential wall".

TABLE 3

| | Effect of preventing exuding of catalyst slurry | Exhaust gas purifying performance | Presence or absence of cracks on coat layer | Strength of circumferential wall (N · m) | |
| --- | --- | --- | --- | --- | --- |
| | | | | Before disposition of coat layer | After disposition of coat layer |
| Example 1 | Excellent | Excellent | Excellent | $1.90 \times 10^{-3}$ | $2.09 \times 10^{-3}$ |
| Example 2 | Excellent | Excellent | Excellent | $1.90 \times 10^{-3}$ | $2.09 \times 10^{-3}$ |
| Example 3 | Excellent | Excellent | Excellent | $1.90 \times 10^{-3}$ | $2.09 \times 10^{-3}$ |
| Example 4 | Excellent | Excellent | Excellent | $1.90 \times 10^{-3}$ | $2.09 \times 10^{-3}$ |
| Example 5 | Excellent | Excellent | Excellent | $1.90 \times 10^{-3}$ | $2.09 \times 10^{-3}$ |
| Example 6 | Excellent | Excellent | Excellent | $1.90 \times 10^{-3}$ | $2.09 \times 10^{-3}$ |
| Example 7 | Excellent | Excellent | Excellent | $1.90 \times 10^{-3}$ | $2.09 \times 10^{-3}$ |
| Example 8 | Excellent | Excellent | Excellent | $8.29 \times 10^{-4}$ | $9.11 \times 10^{-4}$ |
| Example 9 | Excellent | Excellent | Excellent | $5.79 \times 10^{-4}$ | $6.37 \times 10^{-4}$ |
| Example 10 | Excellent | Excellent | Excellent | $2.25 \times 10^{-4}$ | $2.48 \times 10^{-4}$ |
| Example 11 | Excellent | Excellent | Excellent | $2.25 \times 10^{-4}$ | $2.48 \times 10^{-4}$ |
| Example 12 | Excellent | Excellent | Excellent | $2.25 \times 10^{-4}$ | $2.48 \times 10^{-4}$ |
| Example 13 | Excellent | Excellent | Excellent | $1.90 \times 10^{-3}$ | $2.09 \times 10^{-3}$ |
| Example 14 | Excellent | Excellent | Acceptable | $1.90 \times 10^{-3}$ | $2.09 \times 10^{-3}$ |
| Example 15 | Acceptable | Excellent | Excellent | $1.90 \times 10^{-3}$ | $2.09 \times 10^{-3}$ |
| Example 16 | Excellent | Excellent | Acceptable | $1.90 \times 10^{-3}$ | $2.09 \times 10^{-3}$ |
| Example 17 | Acceptable | Excellent | Excellent | $1.90 \times 10^{-3}$ | $2.09 \times 10^{-3}$ |
| Example 18 | Excellent | Excellent | Acceptable | $1.90 \times 10^{-3}$ | $2.09 \times 10^{-3}$ |
| Example 19 | Excellent | Excellent | Acceptable | $1.90 \times 10^{-3}$ | $2.09 \times 10^{-3}$ |
| Example 20 | Excellent | Excellent | Acceptable | $1.90 \times 10^{-3}$ | $2.09 \times 10^{-3}$ |
| Comparative Example 1 | Excellent | Not acceptable | Excellent | $1.90 \times 10^{-3}$ | $2.09 \times 10^{-3}$ |
| Comparative Example 2 | Not acceptable | Excellent | Excellent | $1.90 \times 10^{-3}$ | $2.09 \times 10^{-3}$ |

TABLE 4

| | Effect of preventing exuding of catalyst slurry | Exhaust gas purifying performance | Presence or absence of cracks on coat layer | Strength of circumferential wall (N · m) | |
| --- | --- | --- | --- | --- | --- |
| | | | | Before disposition of coat layer | After disposition of coat layer |
| Example 21 | Excellent | Excellent | Excellent | $1.72 \times 10^{-2}$ | $1.89 \times 10^{-2}$ |
| Example 22 | Excellent | Excellent | Excellent | $1.72 \times 10^{-2}$ | $1.89 \times 10^{-2}$ |
| Example 23 | Excellent | Excellent | Excellent | $1.72 \times 10^{-2}$ | $1.89 \times 10^{-2}$ |
| Example 24 | Excellent | Excellent | Excellent | $1.72 \times 10^{-2}$ | $1.89 \times 10^{-2}$ |
| Example 25 | Excellent | Excellent | Excellent | $1.72 \times 10^{-2}$ | $1.89 \times 10^{-2}$ |
| Example 26 | Excellent | Excellent | Excellent | $1.72 \times 10^{-2}$ | $1.89 \times 10^{-2}$ |
| Example 27 | Excellent | Excellent | Excellent | $1.72 \times 10^{-2}$ | $1.89 \times 10^{-2}$ |
| Example 28 | Excellent | Excellent | Excellent | $1.18 \times 10^{-2}$ | $1.30 \times 10^{-2}$ |
| Example 29 | Excellent | Excellent | Excellent | $1.51 \times 10^{-2}$ | $1.66 \times 10^{-2}$ |
| Example 30 | Excellent | Excellent | Excellent | $9.53 \times 10^{-3}$ | $1.05 \times 10^{-2}$ |
| Example 31 | Excellent | Excellent | Excellent | $9.53 \times 10^{-3}$ | $1.05 \times 10^{-2}$ |
| Example 32 | Excellent | Excellent | Excellent | $9.53 \times 10^{-3}$ | $1.05 \times 10^{-2}$ |
| Example 33 | Excellent | Excellent | Acceptable | $1.72 \times 10^{-2}$ | $1.89 \times 10^{-2}$ |
| Example 34 | Excellent | Excellent | Acceptable | $1.72 \times 10^{-2}$ | $1.89 \times 10^{-2}$ |
| Example 35 | Excellent | Excellent | Acceptable | $1.72 \times 10^{-2}$ | $1.89 \times 10^{-2}$ |
| Example 36 | Excellent | Excellent | Acceptable | $1.72 \times 10^{-2}$ | $1.89 \times 10^{-2}$ |
| Example 37 | Excellent | Excellent | Excellent | $1.72 \times 10^{-2}$ | $1.89 \times 10^{-2}$ |
| Example 38 | Excellent | Excellent | Excellent | $1.72 \times 10^{-2}$ | $1.89 \times 10^{-2}$ |

TABLE 4-continued

|  | Effect of preventing exuding of catalyst slurry | Exhaust gas purifying performance | Presence or absence of cracks on coat layer | Strength of circumferential wall (N · m) | |
|---|---|---|---|---|---|
|  |  |  |  | Before disposition of coat layer | After disposition of coat layer |
| Example 39 | Excellent | Excellent | Excellent | $1.72 \times 10^{-2}$ | $1.89 \times 10^{-2}$ |
| Example 40 | Acceptable | Excellent | Excellent | $1.72 \times 10^{-2}$ | $1.89 \times 10^{-2}$ |
| Comparative Example 3 | Excellent | Not acceptable | Excellent | $2.72 \times 10^{-2}$ | $2.99 \times 10^{-2}$ |
| Comparative Example 4 | Not acceptable | Excellent | Excellent | $2.72 \times 10^{-2}$ | $2.99 \times 10^{-2}$ |

(Discussion)

"The strength of the circumferential wall" was higher after the coat layer had been disposed than the strength before the disposition of the coat layer, in either of the honeycomb structures of Examples 1 to 40 and Comparative Examples 1 to 4. Furthermore, in the honeycomb structures of Examples 1 to 40, "the effect of preventing the exuding of the catalyst slurry" was "excellent" or "acceptable", and "the exhaust gas purification performance" was "excellent". In addition, in the honeycomb structures of Examples 14, 16, 18 to 20 and 33 to 36, cracks generated on the coat layer, but either of "the effect of preventing the exuding of the catalyst slurry" and "the exhaust gas purification performance" was "excellent". The reason therefor is considered that the cracks generated on the coat layer were so slight that they did not extend to the honeycomb substrate. On the other hand, in the honeycomb structures of Comparative Examples 2 and 4 in which the thickness of the penetrated part of the coat layer was lower than 1% of the thickness of the circumferential wall, "the effect of preventing the exuding of the catalyst slurry" was "not acceptable". The reason therefor is considered that, since the thickness of the penetrated part of the coat layer was too thin, the pores of the circumferential wall were occluded incompletely, and thus the exuding of the catalyst slurry was not able to be sufficiently prevented. Furthermore, in the honeycomb structures of Comparative Examples 1 and 3 in which the thickness of the penetrated part of the coat layer was more than 90% of the thickness of the circumferential wall, "the exhaust gas purifying performance" was "not acceptable". The reason therefor is considered that, since the thickness of the penetrated part of the coat layer was too thick, the coat layer penetrated into the pores of the partition wall, and thus the loading of the catalyst in the pores of the partition wall in the penetrated part was disturbed.

The present invention can be preferably used in filters for trapping particulate matters contained in exhaust gases from diesel engines and gasoline engines, and the like, especially in filters for which loading of a catalyst is required, and the like.

DESCRIPTION OF REFERENCE NUMERALS

1: honeycomb structure, 2: honeycomb substrate, 3: coat layer, 4: partition wall, 5: cell, 6: circumferential wall, 7: pore, 8: particle, 9: plugging portion, 11: inlet end face, 12: outlet end face.

What is claimed is:

1. A honeycomb structure, comprising:
a honeycomb substrate having a plurality of porous partition walls that define a plurality of cells that extend from an inlet end face as an inlet side for a fluid to an outlet end face as an outlet side for the fluid, and a porous circumferential wall that is formed monolithically with the partition wall, and
a coat layer that is disposed on at least a part of the outer surface of the circumferential wall and extends around the entire circumference of the circumferential wall,
wherein a part of the coat layer penetrates into the pores of the circumferential wall, and a thickness of the part of the coat layer that penetrates into the pores of the circumferential wall is from 15 to 50% of the thickness of the circumferential wall.

2. A honeycomb structure, comprising:
a honeycomb substrate having a plurality of porous partition walls that define a plurality of cells that extend from an inlet end face as an inlet side for a fluid to an outlet end face as an outlet side for the fluid, and a porous circumferential wall having a porosity of 50% or more, that is formed separately from the partition wall, and
a coat layer that is disposed on at least a part of the outer surface of the circumferential wall,
wherein a part of the coat layer penetrates into the pores of the circumferential wall, and a thickness of the part of the coat layer that penetrates into the pores of the circumferential wall is from 15 to 50% of the thickness of the circumferential wall, and
wherein porosity of the circumferential wall and the partition walls are the same.

3. The honeycomb structure according to claim 1, wherein a remaining part of the coat layer, other than the part that penetrates into the pores of the circumferential wall, has a thickness of 70 μm or less.

4. The honeycomb structure according to claim 1, wherein the coat layer contains Si.

5. The honeycomb structure according to claim 4, wherein the coat layer further contains Ti.

6. The honeycomb structure according to claim 1, wherein the honeycomb substrate has a porosity of from 50 to 75%.

7. The honeycomb structure according to claim 1, wherein the honeycomb substrate has a porosity of from 59 to 67%.

8. The honeycomb structure according to claim 1, which has plugging portions that are configured to plug the open ends of predetermined cells at the side of the inlet end face and the open ends of residual cells at the side of the outlet end face.

9. The honeycomb structure according to claim 2, wherein a remaining part of the coat layer, other than the part that penetrates into the pores of the circumferential wall, has a thickness of 70 μm or less.

10. The honeycomb structure according to claim 9, wherein the coat layer contains Si.

11. The honeycomb structure according to claim 10, wherein the coat layer further contains Ti.

12. The honeycomb structure according to claim 11, wherein the honeycomb substrate has a porosity of from 50 to 75%.

13. The honeycomb structure according to claim 11, wherein the honeycomb substrate has a porosity of from 59 to 67%.

14. The honeycomb structure according to claim 13, which has plugging portions that are configured to plug the open ends of predetermined cells at the side of the inlet end face and the open ends of residual cells at the side of the outlet end face.

* * * * *